Figure 1:
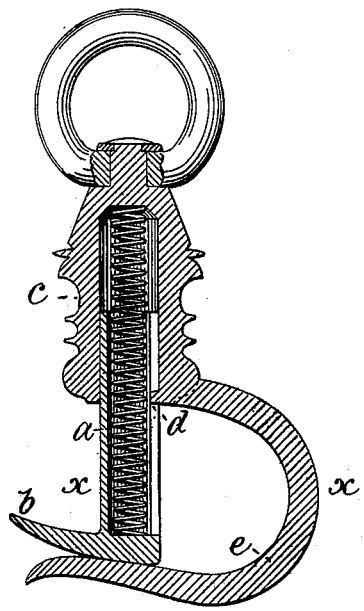

A. WALLACH.
Swivel-Hook.

No. 202,898. Patented April 23, 1878.

WITNESSES.
Walter Pell
Wm Kemble Hall

Antony Wallach
INVENTOR

UNITED STATES PATENT OFFICE.

ANTONY WALLACH, OF NEW YORK, N. Y.

IMPROVEMENT IN SWIVEL-HOOKS.

Specification forming part of Letters Patent No. 202,898, dated April 23, 1878; application filed March 15, 1878.

*To all whom it may concern:*

Be it known that I, ANTONY WALLACH, of New York, in the county and State of New York, have invented a certain new and useful Improvement in Swivel-Hooks, of which the following is a specification:

The said invention relates to the hooks by which watches are secured to their chains, and which are commonly called "swivels," for the reason that they are usually made with a swivel, by which they are connected to the chain. The opening part of the hook is made as a hollow stem that slides in the socket of the swivel, and is provided with a sloping lip that is held against the corresponding lip of the hook by a helical spring inside the socket and the hollow stem. When the ring of a watch is pressed between the lips of the hook and the sliding stem the spring readily yields to permit it to pass into the hook; but when the ring is within the hook it cannot be released without at the same time pressing the stem and spring into the socket from the outer side. To prevent the turning of the stem in the socket, and to retain the lip in its proper position with relation to the hook, the socket is provided with a pin that projects into a slot in the stem, so that the latter may slide in and out of the socket as it may be impelled by external pressure and by the action of the spring, but it cannot turn around in the socket. The most convenient and the cheapest way of making this pin is to form it on the end of the hook, so that it is properly placed when the hook is soldered to the socket.

To enable others skilled in the arts to which it appertains to make and use my invention, I will proceed to describe its construction and operation, with reference to the drawing.

Figure 2:
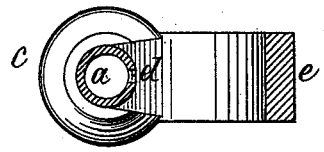

Figure 1 is an enlarged elevation, partly in section, of the said improved swivel-hook; and Fig. 2 is a transverse section at *x*.

The stem *a*, that carries the projecting lip *b* and forms the opening for the hook, slides in the socket *c*, and is pressed outward by the helical spring within it, which rests on the bottom of the socket. The stem *a* is prevented from turning the lip *b* out of its proper position by the pin *d*, that is conveniently formed on the hook *e* when the latter is a separate piece, and which fits into the groove or slot on the side of the stem opposite to that from which the lip *b* projects. When the hook *e* is first soldered to the socket it is turned slightly aside to admit the placing of the spring and stem within the socket, and it is then bent into its proper form to retain the stem.

A ring may be readily slipped between the lips from the outside to the interior of the hook, and the spring securely closes the opening by pressing the stem out and the lips together; but the ring cannot be removed from the hook without first purposely opening the hook by pushing the stem into the socket against the force of the spring.

Both the button-hole hook and the bar, with either of which watch-chains are commonly provided, may also be made in the same manner, with a sliding stem that is pressed across the opening by a spring, and is kept from turning by a pin that fits into a slot.

I claim as my invention—

A watch-chain swivel or hook in which the hollow sliding stem *a*, provided with the lip *b*, is combined with the spring and socket *c*, and the pin *d*, working in a slot, substantially in the manner and for the purpose described.

ANTONY WALLACH.

Witnesses:
 WALTER PELL,
 WM. KEMBLE HALL.